United States Patent Office 3,077,654
Patented Feb. 19, 1963

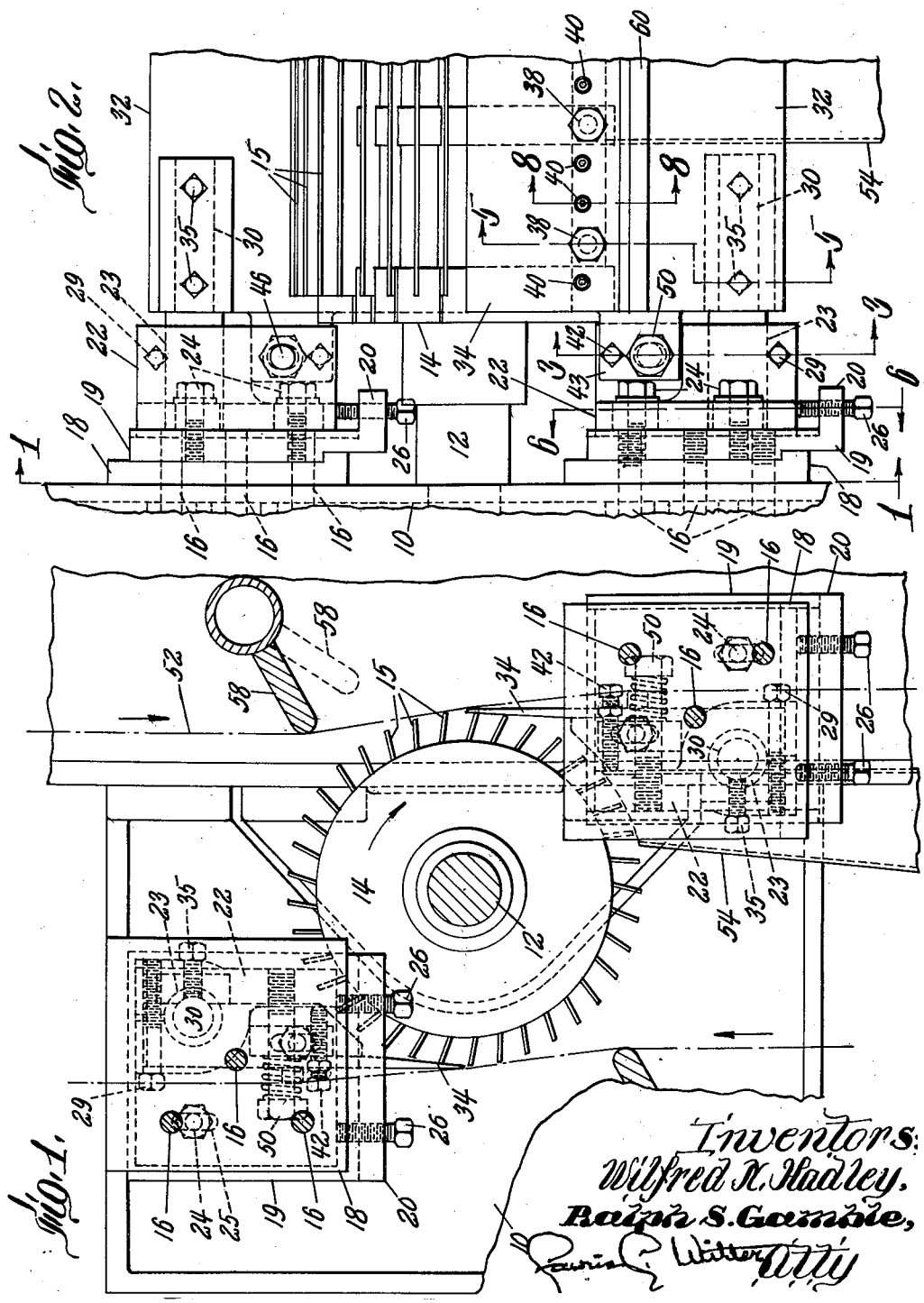

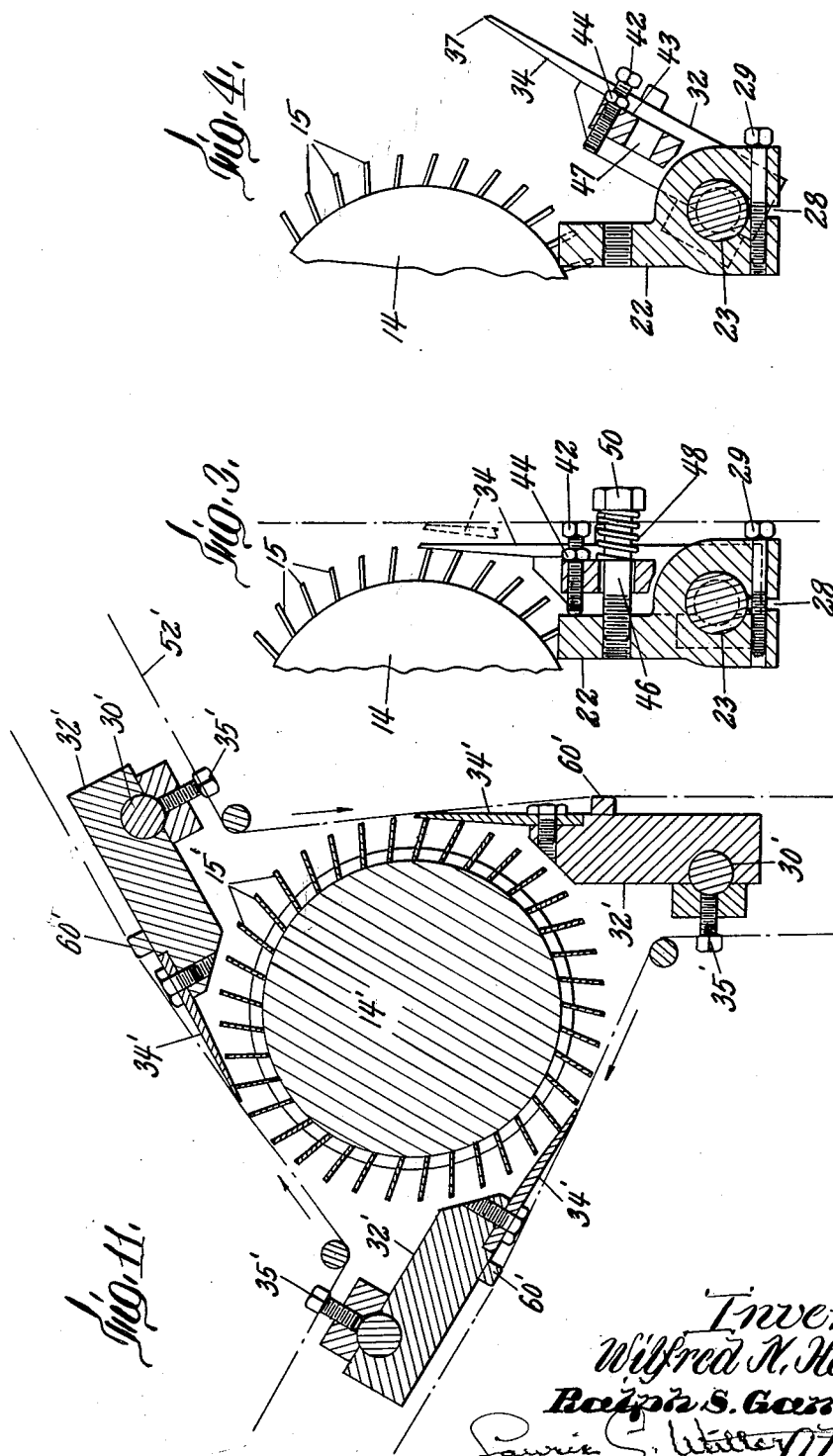

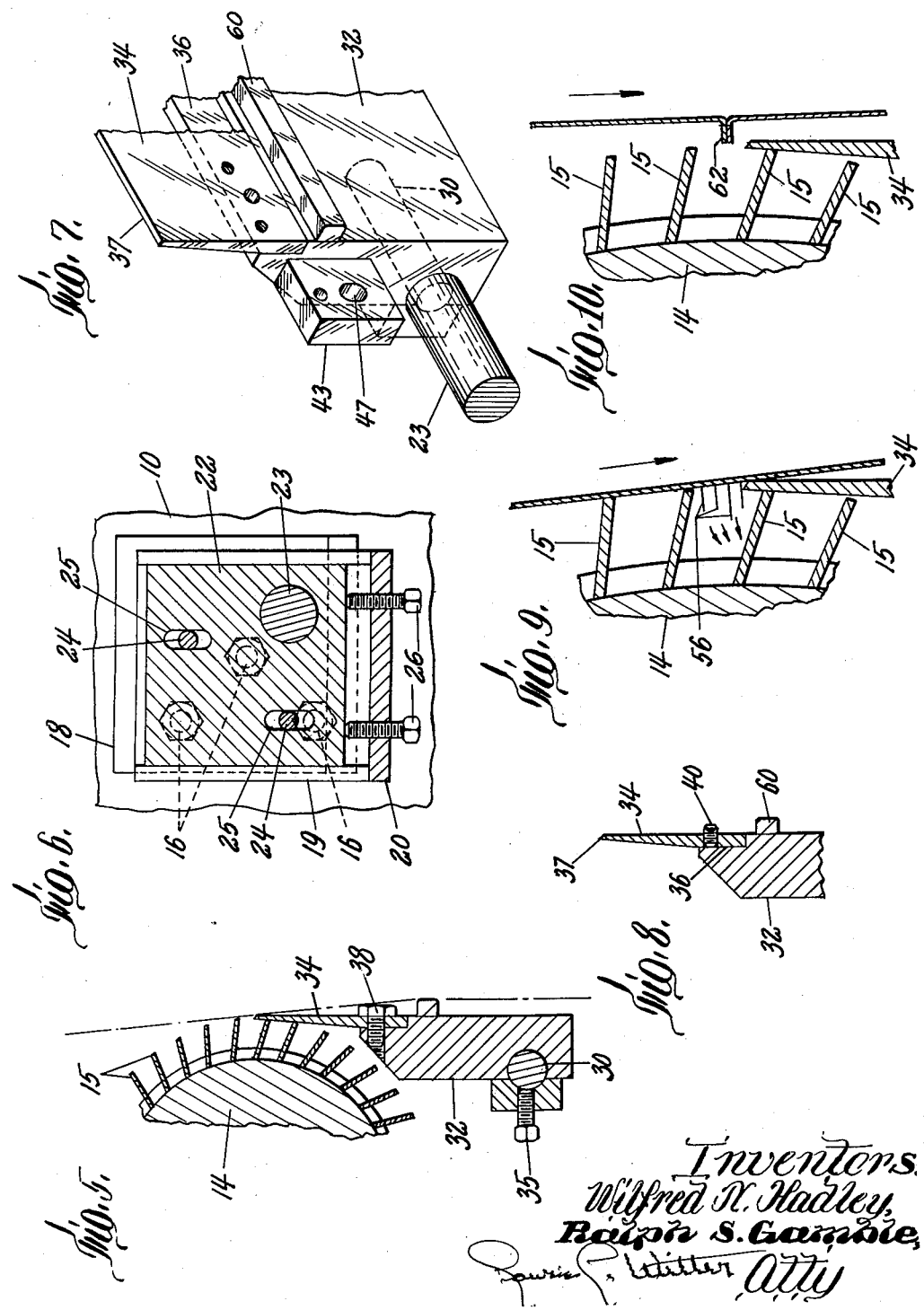

3,077,654
FABRIC SHEARING MACHINE
Wilfred N. Hadley, Springfield, and Ralph S. Gamble, Andover, Vt., assignors to Riggs and Lombard Inc., Lowell, Mass., a corporation of Massachusetts
Filed May 22, 1961, Ser. No. 111,536
4 Claims. (Cl. 26—15)

This invention relates to fabric shearing machines employing one or more rotatably mounted cylindrical revolvers having spaced shearing blades extending longitudinally thereof at its periphery and a fixed ledger knife cooperating with the blades and adapted therewith to shear loose threads from fabric moved longitudinally in open width over the knife and blades. Complete shearing treatment ordinarily requires more than a single passage of the fabric over the ledger knife and to accomplish such treatment the machines have heretofore employed a plurality of revolvers each having a ledger knife over which knives the fabric is continuously fed in succession. One object of our present invention resides in the employment of a plurality of ledger knives spaced equally about each revolver and over which the fabric is fed in succession, thereby multiplying the efficiency of each revolver and very substantially increasing the production and quality of the treated product.

Maximum efficiency requires that the ledger knife shall be located and maintained accurately in proper shearing relation with the revolver blades and that its shearing edge shall be kept honed to the angle at which it is most efficiently cooperating with the blades. Further features of the invention reside in the production of novel mechanism for effecting these functions. This mechanism includes a support mounting the ledger knife for pivotal movement about an axis remote from the shearing edge of the knife and parallel with the rotary axis of the revolver and disposed to pivot such edge away from the revolver blades to a position permitting unobstructed honing of the knife. The mechanism furthermore includes means for securing the knife and its support in the shearing and honing positions and also for accurately adjusting them to the most efficient shearing position relative to the blades and permitting quick and accurate return to this relative position following the honing operation. Other and cooperating means is also provided for resiliently and normally maintaining the knife in shearing relation with the blades and permitting quick backing off of the knife should an obstruction be encountered between the blades and knife.

The ledger knife, consisting of a one-piece flexible blade, and its pivotal support extend the length of the blades and are carried on two coaxial trunnions at the ends of the support. The relatively long knife must present a true and straight shearing edge to the blades and this relation is facilitated by vertically adjustable supporting members for the trunnions and by novel adjustable mounting of the knife blade directly on its pivotal support. This latter includes screws extending directly through the knife blade and threaded into the support in spaced relation longitudinally along the blade and securing it to the support, and studs threaded into the blade in spaced relation along and in abutting contact with the support whereby accurately and uniformly to adjust and align the knife to a shearing straight edge and maintain it in that position.

These and other features of the invention will be more clearly understood from the following description of embodiments thereof illustrated in the accompanying drawings in which FIG. 1 is an end elevation of an embodiment of the invention, taken on line 1—1 of FIG. 2, FIG. 2 is a fragmentary side elevation thereof, FIG. 3 is a sectional view taken on line 3—3 of FIG. 2, FIG. 4 is a like view showing parts in another position, FIG. 5 is a sectional view taken on line 5—5 of FIG. 2, FIG. 6 is a sectional view taken on line 6—6 of FIG. 2, FIG. 7 is a fragmentary perspective view of the ledger knife and its support, FIG. 8 is a sectional view taken on line 8—8 of FIG. 2, FIG. 9 is an enlarged sectional view of a portion of FIG. 5, FIG. 10 is a like view showing the fabric backed off to clear the knife, and FIG. 11 is a sectional view showing a modified form of the invention.

Referring first to FIGS. 1-10 of the drawings, 10 indicates an end wall of the machine which supports thereon and on a like companion wall (not shown) at the opposite end of the machine the shearing mechanism now to be described, the supported parts shown in the drawings being duplicated at said opposite end of the machine. Rotatably mounted at its ends in and between the walls 10 is a shaft 12 carrying a cylindrical revolver 14 having spaced shearing blades 15 on and extending longitudinally thereof at its periphery. The blades can be disposed straight along the revolver as illustrated or can extend spirally thereabout.

Secured in face to face contact with each other and to each wall 10 at opposite sides of the revolver, as by bolts 16, are two plates 18 and 19, each plate 19 having a horizontal flange 20 along its bottom margin. Mounted in face to face contact on each plate 19 is a bracket 22 providing a bearing therein for receiving and supporting a trunnion 23, each bracket being supported for vertical adjustment on its plate 19 by bolts 24 extending through slots 25 in the bracket. Each bracket is furthermore adjustably supported on screws 26 threaded into the flange 20 and contacting the bracket. The bearing portion of each bracket is also slotted at 28 and provided with a clamping screw 29 for tightening the bracket onto the trunnion.

The trunnions 23 have reduced ends 30 seated coaxially in the ends of a support 32 for a ledger knife 34 disposed to cooperate with the blades 15. Set screws 35 are provided for securing the support non-rotatably to the trunnions. The ledger knife comprises a single-piece blade seated on a flange-like portion 36 of the support and extending forwardly therefrom to a free shearing marginal edge 37 adapted to have shearing contact with the blades 15. The ledger knife extends the length of the blades 15 and is secured directly to the support by binding screws 38 in spaced relation along and extending through the knife. Proper shearing relation with the blades requires that the knife shall be aligned to present a true and straight shearing edge to the blades and such adjustment of the knife is facilitated by studs 40 threaded into the knife and in abutting contact with the knife supporting surface 36. The cooperation of the binding screws 38 and studs 40 directly on and along the one-piece knife blade makes possible the quick, accurate and uniform correction or straightening of the knife to the straight shearing edge required for accurate shearing cooperation with the blades 15 and the maintaining of it in such position, it being understood that the single-piece construction of the knife renders it uniformly flexible along its entire length whereby the accurate and uniform adjustment is directly effected and maintained. The slots 25 in the brackets 22 together with the screws 26 provide means for adjusting the two ends of the knife unit and aligning the shearing edge to the proper horizontal position along the blades 15.

The trunnions 23 permit pivotal movement of the ledger knife and its support to and from the shearing position of FIGS. 1 and 3 and the honing position of FIG. 4 and the unit can be secured in the honing position by tightening the clamping screws 29. The adjustment of the ledger knife to the proper shearing position is a critical adjustment requiring micrometer-like movement of the knife and such adjustment is provided by a stop screw 42 threaded through a lug 43 on each end of the support 32 and in position to contact the bracket 22, a lock nut 44 being provided on the screw for securing it in adjusted position. A further important feature of the invention resides in the employment of resilient means for holding the ledger knife in such position and in predetermined pressure contact with the shearing blades. Means provided at each end of the ledger knife unit for performing this function comprises a binder screw 46 extending loosely through a slot 47 in the lug 43 and threaded into the bracket 22. A compression spring 48 on the screw between the screw head 50 and the lug 43 serves to force the ledger knife unit forwardly with constant pressure which can be varied to the desired extent merely by rotating the screw. This resilient action serves furthermore to permit quick backward movement of the knife unit, as illustrated in broken lines in FIG. 3, and prevent damage to the knife and blades should any material or obstruction be encountered therebetween. Upon removing the screws 46 the ledger knife unit can be pivoted to the honing position shown in FIG. 4 and secured in such position during honing of the knife by tightening the clamping screws 29. When the unit is returned to the shearing position contact of the screws 42 with the bracket relocates the knife in the exact and properly adjusted shearing position and upon replacement of the screws 46 the springs 48 function to maintain the knife forwardly in such position.

The function of the machine is primarily to remove knots and the like and loose thread ends left by the shuttles as they empty during the weaving operation. The revolver employed can be of (1) the "skeleton" or air draft flyblade type, shown in Patent No. 2,606,355, wherein the blades are spaced from the bottoms of annular channels and create an air suction for facilitating the thread removing function now to be described, or of (2) the solid roll type. Extending along the ledger knife and revolver beneath the fabric 52 is an air suction duct 54 for drawing air from the revolver and thereby drawing the loose threads 56 into shearing position between the blades 15 as illustrated by arrows in FIG. 9. While only a single revolver is illustrated in the drawings it will be understood that two or more revolvers will ordinarily be employed in the machine and the fabric strip 52 is fed successively over the several ledger knives where each cooperates with the blades 15 to perform the shearing function. The fabric is fed over a guide bar 58 which holds the fabric in contact with the blades 15 and knife 34 (FIG. 1) and from which it passes over and in contact with a bar 60 on the knife support 32. Solenoid operated means (not shown) is provided for rotating the guide bar 58 to the position shown in broken lines in FIG. 1 when a strip joining seam 62 approaches the shearing knife 34. This action permits the taut fabric to back away as illustrated in FIG. 10 and thereby prevent damage to the blades and knife.

While in FIGS. 1–10 of the drawings we have illustrated and above described a machine employing two ledger knives 34 located diametrically opposite each other on the revolver, it will be understood that such number of ledger knives can be employed on each revolver as is found desirable and feasible. For example, in FIG. 11 we have illustrated a revolver 14′ having three ledger knives 34′ disposed in equally spaced relation thereabout. The parts corresponding to the parts shown in FIGS. 1–10 are indicated by like reference characters primed and the fabric 52′ is fed over the ledger knives and blades in like manner as heretofore described.

It will now be apparent that we have produced and herein disclosed an improved fabric shearing machine of the nature described which not only multiplies the efficiency of the machine and very substantially increases its productivity but which also very substantially facilitates the functioning and efficiency of the shearing operation. The direct adjustable mounting of the relatively long and one-piece ledger knife whereby a straight shearing edge to the blades 15 is presented and maintained, the novel provision for honing the knife to the proper angle and the means for maintaining the knife in resilient and predetermined pressure contact with the blades are particularly important in the improved machine.

Having thus disclosed our invention what we claim as new and desire to secure by Letters Patent is:

1. In a cloth shearing machine, a rotatably mounted cylinder having a plurality of spaced shearing blades extending longitudinally thereof at its periphery, a ledger knife disposed longitudinally of the cylinder and having one longitudinal margin in shearing relation with said blades, means including a support for the ledger knife and coaxial trunnions at opposite ends thereof mounting the ledger knife for pivotal movement about an axis remote from said margin and parallel with the rotary axis of the cylinder and disposed to pivot said margin rearwardly away from said blades, fixed supports at opposite ends of the ledger knife, trunnion supporting members mounted on the fixed supports, and means for adjusting said members vertically on the fixed supports and securing them in adjusted position.

2. In a cloth shearing machine, a rotatably mounted cylinder having a plurality of spaced shearing blades extending longitudinally thereof at its periphery, a ledger knife disposed longitudinally of the cylinder and having one longitudinal margin in shearing relation with said blades, means including a support mounting the ledger knife for pivotal movement about an axis remote from said margin and parallel with the rotary axis of the cylinder and disposed to pivot said margin rearwardly away from said blades, adjustable stop means for limiting forward pivotal movement of the ledger knife toward said blades and into accurate shearing relation therewith, a binder screw extending loosely through the ledger knife support and anchored at its inner end, and resilient means comprising a compression spring on the binder screw and in expanding contact with the outer face of said support for normally moving the ledger knife forwardly to and holding it in said shearing relation position.

3. In a cloth shearing machine, a rotatably mounted cylinder having a plurality of spaced shearing blades extending longitudinally thereof at its periphery, a ledger knife disposed longitudinally of the cylinder and having one longitudinal margin in shearing relation with said blades, means including a support mounting the ledger knife for pivotal movement about an axis remote from said margin and parallel with the rotary axis of the cylinder and disposed to pivot said margin rearwardly away from said blades, a fixed body carrying said support, a stop screw threaded into the support in position to engage said body and limit forward pivotal movement of the ledger knife toward said blades and into accurate shearing relation therewith, a binder screw extending loosely through the support and threaded into the body, and a compression spring on the binder screw rearwardly of and in expanding contact with said support.

4. In a cloth shearing machine, a rotatably mounted cylinder having a plurality of spaced shearing blades extending longitudinally thereof at its periphery, a ledger knife comprising a flexible single-piece blade disposed longitudinally of the cylinder and having one longitudinal margin in shearing relation with said shearing blades, a support for the ledger knife blade disposed longitudinally along and adjacent to the cylinder, the marginal portion of the knife blade opposite to said one longitudinal margin being in face to face contact with said support, screw threaded members extending through the knife blade and threaded into the support in spaced relation longitudinally along the knife blade and securing it to the support, and other screw threaded members threaded into an integral portion of the knife blade in spaced relation therealong and in abutting contact with the knife blade supporting face of said support, said screw threaded members being adapted directly and uniformly to flex the ledger knife blade into accurate shearing relation to said shearing blades and maintain such relation.

References Cited in the file of this patent

UNITED STATES PATENTS

| | | |
|---|---|---|
| 545,957 | Gessner | Sept. 10, 1895 |
| 1,686,499 | Richardson | Oct. 2, 1928 |
| 2,389,800 | Marble | Nov. 27, 1945 |

FOREIGN PATENTS

| | | |
|---|---|---|
| 577,943 | Germany | June 7, 1933 |
| 959,905 | Germany | Mar. 14, 1957 |
| 5,564 | Great Britain | of 1827 |
| 8,036 | Great Britain | of 1893 |